(12) United States Patent
Omoto et al.

(10) Patent No.: US 6,666,248 B2
(45) Date of Patent: Dec. 23, 2003

(54) PNEUMATIC TIRE FOR CONSTRUCTION VEHICLE HAVING SIDEWALL PROTECTORS

(75) Inventors: Norio Omoto, Hiratsuka (JP); Shuuichi Fukutani, Onomichi (JP); Daisuke Kanenari, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/178,391

(22) Filed: Jun. 25, 2002

(65) Prior Publication Data

US 2003/0005993 A1 Jan. 9, 2003

(30) Foreign Application Priority Data

Jun. 25, 2001 (JP) ......................... 2001-190944

(51) Int. Cl.[7] .......................... B60C 13/02; B60C 19/12
(52) U.S. Cl. ........................ 152/523; 152/196
(58) Field of Search ................. 152/523, 196, 152/555

(56) References Cited

U.S. PATENT DOCUMENTS 4,230,169 A * 10/1980 Boileau et al. ......... 152/523 X

FOREIGN PATENT DOCUMENTS

| JP | 61081207 A | * 4/1986 | ................. 152/523 |
| JP | 6-6006 U | 1/1994 | |
| JP | 6-316206 A | 11/1994 | |

* cited by examiner

*Primary Examiner*—Adrienne C. Johnstone
(74) *Attorney, Agent, or Firm*—Rader Fishman & Grauer

(57) ABSTRACT

Disclosed is a pneumatic tire for a construction vehicle, which enhances a reinforcement effect by protectors provided on a sidewall portion. This pneumatic tire includes: at least two convex-shaped protectors extended in a tire circumferential direction, the protectors being provided in a range of 30 through 65% of a tire cross-sectional height on at least one of sidewall portions; and elastomeric reinforcing members buried inside the protectors, wherein a 100% modulus of the elastomeric reinforcing members is set at 5 through 25 times a 100% modulus of a rubber composition of the sidewall portion adjacent thereto.

4 Claims, 1 Drawing Sheet

PNEUMATIC TIRE FOR CONSTRUCTION VEHICLE HAVING SIDEWALL PROTECTORS

BACKGROUND OF THE INVENTION

The present invention relates to a pneumatic tire for a construction vehicle, which is used mainly in a construction site. More specifically, the present invention relates to a pneumatic tire for a construction vehicle, in which a reinforcement effect by a protector provided on a sidewall portion thereof is improved.

Since the pneumatic tire for a construction vehicle is used in a severe environment, for example, where the sidewall portion thereof is rubbed against obstacles such as rocks, a convex-shaped protector extended in a tire circumferential direction is provided on the sidewall portion thereof.

However, in the case where the protector is formed of the same rubber composition as that of the sidewall portion to be convex-shaped, a reinforcement effect thereof is not necessarily sufficient, and thus a situation occurs, where the sidewall portion suffers a cut damage while the tire is running, so that the tire becomes unusable before a wear lifetime thereof comes.

SUMMARY OF THE INVENTION

The object of the present invention is to provide a pneumatic tire for a construction vehicle, which is capable of enhancing the reinforcement effect by the protector provided on the sidewall portion.

In order to attain the foregoing object, a pneumatic tire for a construction vehicle according to the present invention comprises: at least two convex-shaped protectors extended in a tire circumferential direction, the protectors being provided in a range of 30 through 65% of a tire cross-sectional height on at least one of sidewall portions; and elastomeric reinforcing members buried inside the protectors, wherein a 100% modulus of the elastomeric reinforcing members is 5 through 25 times a 100% modulus of a rubber composition of the sidewall portion adjacent thereto.

As described above, since such high modulus elastomeric reinforcing members are buried inside the protectors, the reinforcement effect by the protectors can be enhanced, and the cut damage of the sidewall portions while the tire is running can be effectively prevented. Moreover, since the elastomeric reinforcing members have an appropriate modulus, even if the tire is used in a severe environment such as a construction site, the elastomeric reinforcing members hardly cause separation and exfoliation defects from the sidewall portions. It is preferable that the elastomeric reinforcing members have a fracture strength ranging from 10 through 50 MPa and a fracture elongation of 150% or more. As such elastomeric reinforcing members, an elastomeric reinforcing material is recommended for use, which is composed by crosslinking, with organic peroxides, a composition obtained by dispersing metal salt of acrylic acid or methacrylic acid into highly saturated rubber of ethylenic unsaturated nitrile-conjugate diene in which a content of conjugate diene units of 30% by weight or less.

DETAILED DESCRIPTION OF THE PREFERRED EMBODIMENTS

Figure 1:
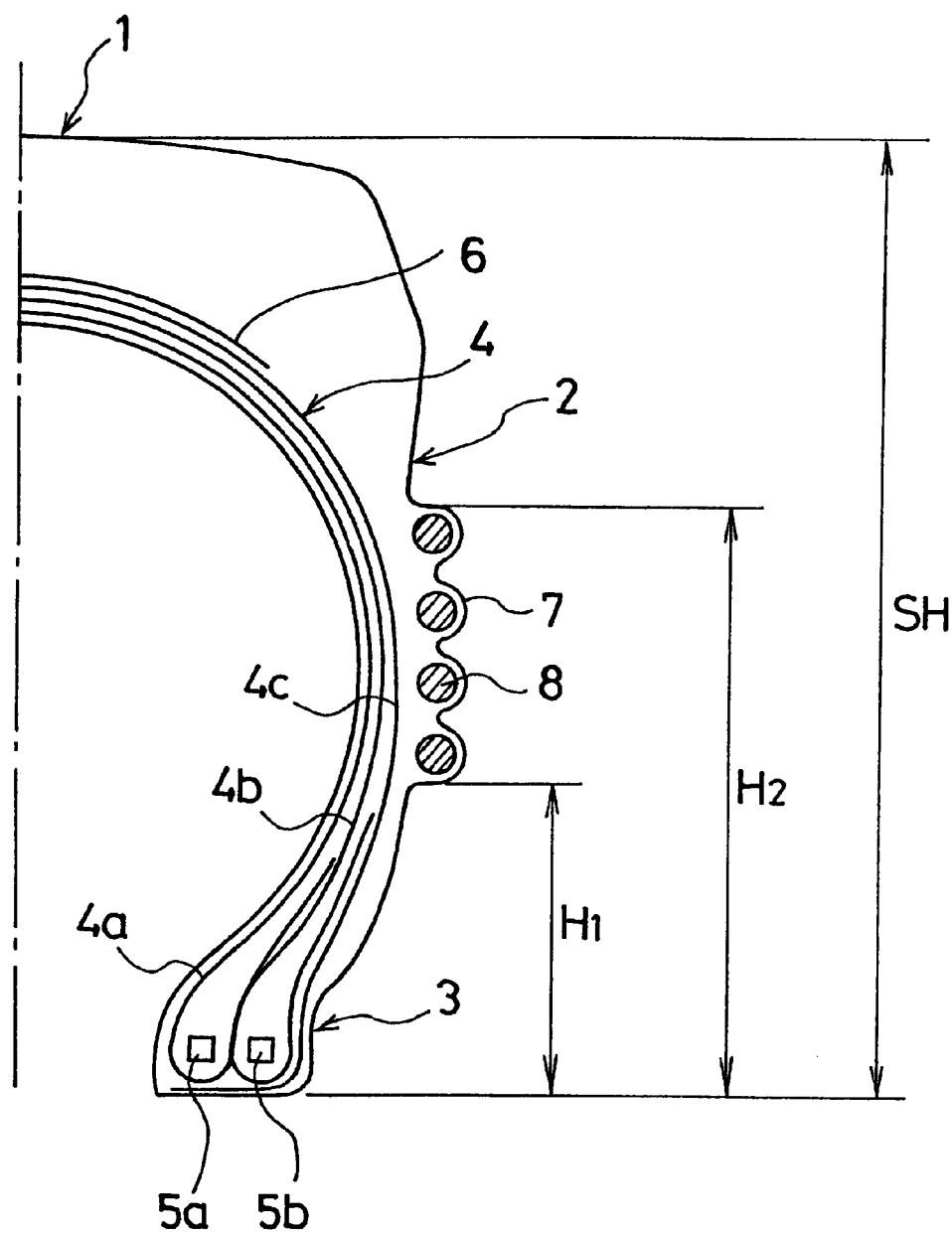
FIG. 1 is a semi-cross-sectional view along a meridian direction showing a pneumatic tire for a construction vehicle according to an embodiment of the present invention.

Hereinafter, description will be made in detail for a constitution of the present invention with reference to the accompanying drawing.

FIG. 1 shows a pneumatic tire for a construction vehicle according to an embodiment of the present invention. Reference numeral 1 denotes a tread portion, numeral 2 denotes a sidewall portion, and numeral 3 denotes a bead portion. Between a right-and-left pair of the bead portions 3 and 3, a carcass layer 4 consisting of plural layers is bridged. In the carcass layer 4 of the plural layers, an end portion of an inside carcass layer 4a is wound around a bead core 5a from the inside of the tire up to the outside thereof. An end portion of an outside carcass layer 4b is wound around a bead core 5b from the inside of the tire up to the outside thereof. An end portion of a further outside carcass layer 4c is disposed outside the carcass layer 4b. Meanwhile, in an outer circumferential side of the carcass layer 4 in the tread portion 1, a breaker 6 consisting of plural layers is buried.

On at least one of the sidewall portions 2, at least two convex-shaped protectors 7 extended in a tire circumferential direction are provided. These protectors 7 are formed circularly sandwiching concave grooves continuous in the tire circumferential direction. With regard to an area where the protectors 7 are formed, a height $H_1$ of a boundary thereof on a bead side is set at 30% of a tire cross-sectional height SH, and a height $H_2$ of a boundary thereof on a tread side is set at 65% of the tire cross-sectional height SH. On the area as described above, at least two convex-shaped protectors 7 are formed, and thus the sidewall portion 2 is effectively protected. Note that the protectors 7 may be provided only on the one of the sidewall portions 2, or alternatively, on both of the sidewall portions 2. In the case where the protectors 7 are provided only on the one of the sidewall portions 2, the pneumatic tire may be attached to a vehicle so that the protectors 7 can be disposed in the outside of the vehicle.

Inside the protectors 7, circular elastomeric reinforcing members 8 continuous along the protectors 7 are buried. A cross-sectional shape of the elastomeric reinforcing members 8 is not particularly limited, and besides the illustrated circular shape, the cross-sectional shape may be rectangular and so on. Moreover, though the elastomeric reinforcing members 8 are desirably buried inside the entire protectors 7, the elastomeric reinforcing members 8 may not be necessarily buried inside the entire protectors 7, and for reinforcement, may be buried only in protectors 7 apt to be cut or in every other protector 7. Moreover, the protectors 7 are not necessarily required to be rings, and the protectors 7 may be spirally formed, in which the elastomeric reinforcing members 8 are buried.

A 100% modulus of the elastomeric reinforcing members 8 is 5 through 25 times, preferably 10 through 25 times, a 100% modulus of the rubber composition of the sidewall portion 2 adjacent thereto. For example, when the 100% modulus of the rubber composition composing the sidewall portion 2 is approximately 2 MPa, the 100% modulus of the elastomeric reinforcing members 8 will be set in a range from 10 through 50 MPa. As described above, the high modulus elastomeric reinforcing members 8 are buried inside the protectors 7, and thus the reinforcement effect by the protector 7 can be enhanced, and the cut damage of the sidewall portions while the tire is running can be effectively prevented. If the 100% modulus of the elastomeric reinforcing members 8 is less than 5 times the 100% modulus of the rubber composition of the sidewall portion 2 adjacent thereto, then the reinforcement effect thereof will be short. On the contrary, if the 100% modulus of the elastomeric reinforcing members 8 exceeds 25 times the 100% modulus of the rubber composition of the sidewall portion 2, then an apprehension for separation and exfoliation of the elastomeric reinforcing members 8 from the sidewall portion 2 occurs when a large forced deformation occurs in the sidewall portion 2 because the tire runs aground on a rock and so on.

Moreover, it is recommended, with regard to the elastomeric reinforcing members 8, that a fracture strength thereof be set in a range from 10 through 50 MPa, and more preferably, in a range from 10 to 40 MPa, and that a fracture elongation thereof be 150% or more, and more preferably, set in a range from 150 to 500%. If the fracture strength of the elastomeric reinforcing members 8 is less than 10 MPa, then the reinforcement effect thereof is lowered. On the contrary, if the fracture strength thereof exceeds 50 MPa, then a difference in hardness compared with the sidewall portion 2 becomes too large, and there occurs an apprehension for destruction thereof due to stress concentration to an interface between the elastomeric reinforcing members 8 and the sidewall portion 2. If the fracture elongation of the elastomeric reinforcing members 8 is less than 150%, then responsiveness thereof to the deformation of the sidewall portion 2 is lowered.

Furthermore, it is preferable that the product of the 100% modulus (MPa) of the elastomeric reinforcing members 8 and the fracture elongation (%) thereof be 2000 or more. For example, it is recommended that the fracture elongation be 400% or more when the 100% modulus is 5 MPa, and that the fracture elongation be 150% or more when the 100% modulus is 13.3 MPa.

The physical property of the above-described elastomeric reinforcing members 8 is not obtained from a steel cord or an organic fiber cord. As such elastomeric reinforcing members 8 as described above, a rubber composition can be used, which is composed by crosslinking, with organic peroxides, a composition obtained by dispersing metal salt of acrylic acid or methacrylic acid into highly saturated rubber of ethylenic unsaturated nitrile-conjugate diene in which a content of conjugate diene units of 30% by weight or less. Note that the highly saturated rubber is rubber, in which a hydrogenation rate of a double bond between carbon atoms is 70% or more.

More concretely, a rubber composition can be used, which is obtained by compounding 10 through 120 parts by weight of metal salt of acrylic acid or methacrylic acid and 0.3 through 10 parts by weight of organic peroxides as a crosslinker with total 100 parts by weight of rubber containing 40 parts by weight or more of highly saturated rubber of ethylenic unsaturated nitrile-conjugate diene in which the content of the conjugate diene units is 30% by weight or less. As a matter of course, it is possible to add, to the above-described rubber composition, various compounding agents usually used in the rubber industry, for example, a reinforcing agent, a crosslinking accelerator, a plasticizer, a stabilizer and the like according to needs.

Besides a copolymer of ethylenic unsaturated nitrie such as acrylonitrile and methacrylonitrile and conjugate diene such as 1,3-butadiene, isoprene and 1,3-pentadiene, highly saturated rubber of ethylenic unsaturated nitrile-conjugate diene may be a multipolymer containing the above-described two types of monomers and a monomer copolymerizable therewith, for example, a vinyl aromatic compound, (meth)acrylic acid, alkyl(meth)acrylate, alkoxyalkyl(meth)acrylate, cyanoalkyl(meth)acrylate and the like. Concretely, such highly saturated rubber can include acrylonitrile-butadiene copolymer rubber, acrylonitrile-isoprene copolymer rubber, acrylonitrile-butadiene-isoprene copolymer rubber, acrylonitrile-butadiene-acrylate copolymer rubber, acrylonitrile-butadiene-acrylate-methacrylic acid copolymer rubber, and the like. Particularly, hydrogenated NBR is preferable.

The metal salt of acrylic acid or methacrylic acid can include zinc polymethacrylate and the like.

The organic peroxides can include dicumyl peroxide, di-t-butyl peroxide, t-butylcumyl peroxide, benzoyl peroxide, 2,5-dimethyl-2,5-di(benzoyl peroxy)hexane, 2,5-dimethyl-2,5-mono(t-butyl peroxy)hexane and the like.

Moreover, in order to tightly adhere the elastomeric reinforcing members 8 to the sidewall portion 2, it is desirable that the above-described rubber composition be wrapped with an adhesive layer.

As this adhesive layer, a rubber composition is recommended for use, which is composed by compounding 10 through 60 parts by weight of zinc methacrylate, 0.3 through 10 parts by weight of organic peroxides, and a co-crosslinker having any of an acrylic group, a methacrylic group and an aryl group and being liquid at room temperature with total 100 parts by weight of rubber containing 50 through 85 parts by weight of at leastone type of diene rubber selected from natural rubber, polyisoprene rubber, polybutadienoe rubber and conjugate diene-aromatic vinyl copolymer rubber and 15 through 50 parts by weight of highly saturated rubber of ethylenic unsaturated nitrile-conjugate diene in which the content of the conjugate diene units is 30% by weight or less.

EXAMPLE

With regard to a pneumatic tire for a construction vehicle, which is specified to be resistant to cut in tread and to be puncture preventive, in which a tire size is 1800-25 28PR, a smooth tread of TRA CODE L5S is provided, and in a tread portion, two plies of steel breakers for preventing penetration of the tread portion are arranged, a tire of the present invention, a comparative tire and a conventional tire were fabricated, in which only structures of protectors provided in sidewall portions thereof were made different from one another. Table 1 shows physical properties regarding reinforcing members of the protectors of these tires. Note that, with regard to the rubber composition for use in the sidewall portions, the fracture elongation is 580%, the fracture strength is 25 MPa, and the 100% modulus is 2.0 MPa. In Table 1, "modulus ratio" means a ratio of the 100% modulus of the reinforcing member to the 100% modulus of the rubber composition of the sidewall portions.

Tire of the Present Invention

In the range of 30 through 65% of the tire cross-sectional height in the side wall portion, four convex-shaped protectors extended in the tire circumferential direction were provided, and inside each protector, an elastomeric reinforcing member was buried, which has a diameter of 12 mm and is formed circularly along the protector. This elastomeric reinforcing member is a rubber composition composed by crosslinking, with organic peroxides, a composition obtained by highly dispersing zinc polymethacrylate into hydrogenated NBR. The product name of the composition is ZSC2395 manufactured by ZEON Corporation.

Comparative Tire

In the range of 30 through 65% of the tire cross-sectional height in the side wall portion, four convex-shaped protectors extended in the tire circumferential direction were provided, and inside each protector, a steel cord having a diameter of 3 mm was buried. This steel cord was obtained by loosely twisting four cords, each having a twisting structure of 7×7×0.23, and was imparted with elongation.

Conventional Tire

In the range of 30 through 65% of the tire cross-sectional height in the sidewall portion, four convex-shaped protectors extended in the tire circumferential direction were provided, and inside of the each protector, no reinforcing member was buried. Namely, the protectors were composed only of the rubber composition of the sidewall portion. In Table 1, physical properties of the rubber compound used for the sidewall portions were indicated in place of that of the reinforcing member.

TABLE 1

| | | Tire of the Present Invention | Comparative Tire | Conventional Tire |
|---|---|---|---|---|
| Protector Reinforcing Member | Type | Rubber Composition | Steel Cord | None |
| | Fracture Elongation (%) | 350 | 3 through 4 | (580) |
| | Fracture Strength (MPa) | 30 | 2500 | (25) |
| | 100% Modulus (MPa) | 20 | — | (2.0) |
| | Modulus ratio | 10 | — | (1) |

Evaluation Method A

By use of an indoor rotary drum testing machine, and under the condition where the rim size is 25×13.00–2.5, the air pressure is 650 kPa, the load is 188 kN (140% load), and the speed is 8 km/h, the tire of the present invention and the comparative tire were made to run. Two semicircular cylindrical protrusions, each having a radius of 80 mm, were disposed on the surface of the rotary drum, and thus an impact load and a forced deformation were given to the tire for each rotation.

As a result of the above, no particular problem occurred in the tire of the present invention even if it was made to run for 240 hours. Note that it is required in the market that the tire be allowed to run for 200 hours or more in terms of durability. Meanwhile, in the comparative tire, since a crack occurred in 48 hours from the sidewall portion reinforced by the steel cords to reach the carcass portion, the running was discontinued. This crack occurred due to shortage in elongation of the steel cords with respect to the deformation of the tire.

Evaluation Method B

The tires of the present invention and the conventional tires were attached to carrier dump trucks in an underground mine, and were actually used for the carrying work in the underground mine.

As a result of the above, the number of tires thrown for a certain period of time, the ratio of the tires exchanged due to the wear lifetime (the rate of complete running), and the average lifetime of the tires were as shown in Table 2 to be illustrated below.

TABLE 2

| | Tire of the Present Invention | Conventional Tire |
|---|---|---|
| Thrown Number | 82 | 248 |
| Rate of Complete Running (%) | 72 | 24 |
| Average Lifetime (Hr.) | 1520 | 785 |

As understood from Table 2, since the tire of the present invention is hard to cause the cut damage, the thrown number was smaller, the rate of complete running was higher, and the average lifetime was longer than the conventional tire.

As described above, according to the present invention, the pneumatic tire comprises: at least two convex-shaped protectors extended in the tire circumferential direction, the protectors being provided in the range of 30 through 65% of the tire cross-sectional height on at least one of the sidewall portions; and the elastomeric reinforcing members buried inside the protectors, wherein the 100% modulus of the elastomeric reinforcing members is 5 through 25 times the 100% modulus of the rubber composition of the sidewall portion adjacent thereto. Therefore, the reinforcement effect by the protectors can be enhanced to effectively prevent the cut damage while the tire is running, and moreover, the separation and exfoliation defects of the elastomeric reinforcing members from the sidewall portion do not occur.

As above, description has been made in detail for the preferred embodiments of the present invention, however, it should be understood that various modifications, alterations and substitutions can be made therefor without departing from the spirit and the scope of the present invention prescribed by the accompanying claims.

What is claimed is:

1. A pneumatic tire for a construction vehicle, comprising:
   a pair of sidewall portions;
   at least two convex-shaped protectors extended in a tire circumferential direction, the protectors being provided in a range of 30 through 65% of a tire cross-sectional height on the outside of at least one of the sidewall portions; and
   elastomeric reinforcing members at least partially buried inside the protectors,
   wherein a 100% modulus of the elastomeric reinforcing members is 5 through 25 times a 100% modulus of a rubber composition of the sidewall portion adjacent thereto.

2. The pneumatic tire for a construction vehicle according to claim 1,
   wherein a fracture strength of the elastomeric reinforcing members is set in a range from 10 through 50 MPa, and a fracture elongation thereof is 150% or more.

3. The pneumatic tire for a construction vehicle according to any one of claims 1 and 2,
   wherein the elastomeric reinforcing members are composed by crosslinking, with organic peroxides, a composition obtained by dispersing metal salt of any one of acrylic acid and methacrylic acid into highly saturated rubber of ethylenic unsaturated nitrile-conjugate diene in which a content of conjugate diene units is 30% by weight or less.

4. The pneumatic tire for a construction vehicle according to any one of claims 1 and 2,
   wherein the elastomeric reinforcing members are composed of a rubber composition obtained by compounding 10 through 120 parts by weight of metal salt of any one of acrylic acid and methacrylic acid and 0.3 through 10 parts by weight of organic peroxides as a crosslinker with total 100 parts by weight of rubber containing 40 parts by weight or more of highly saturated rubber of ethylenic unsaturated nitrile-conjugate diene in which a content of conjugate diene units is 30% by weight or less.

* * * * *